Nov. 21, 1939.  W. J. WILSON ET AL  2,180,492
AIR CUSHION RAIL TRUCK
Filed Nov. 29, 1937  3 Sheets-Sheet 1
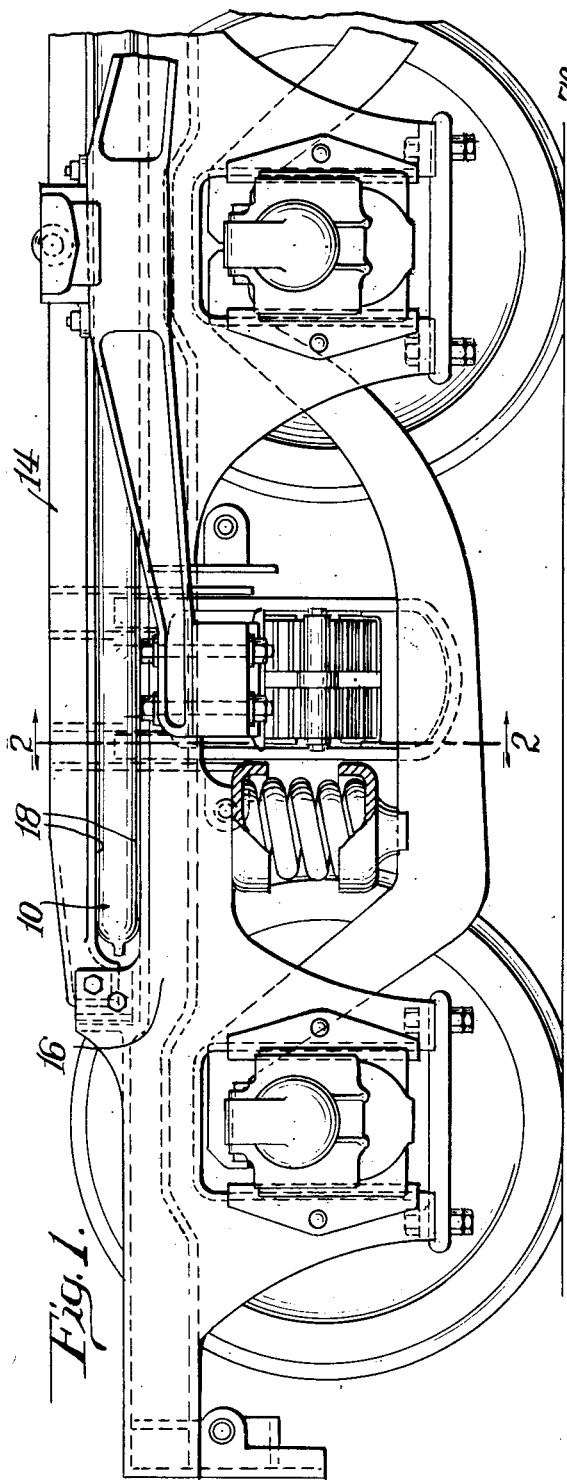
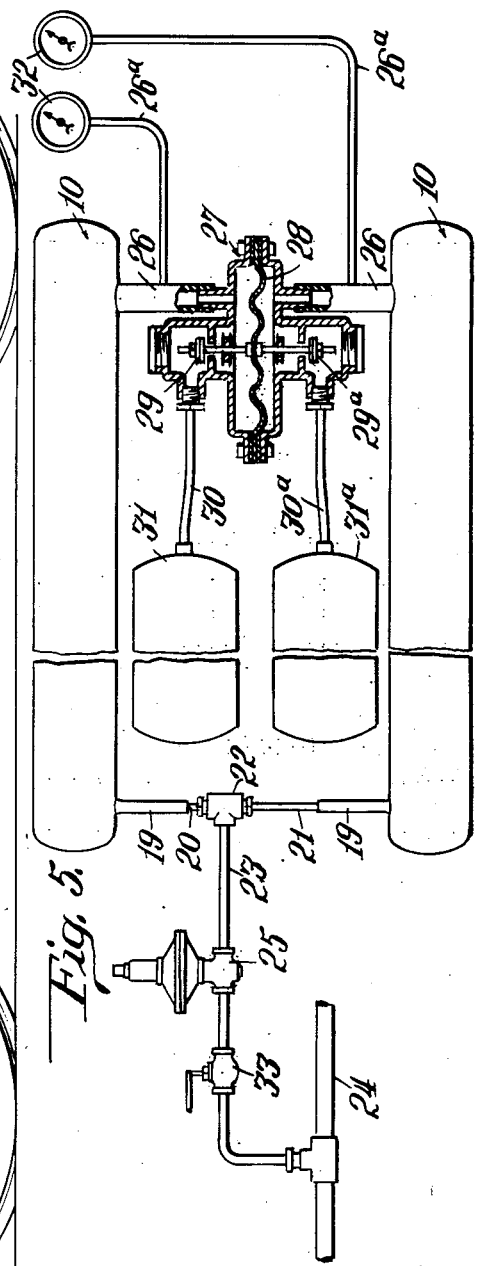
Inventors
William J. Wilson
Ernest F. Dyke
By George Heidman
Attorney

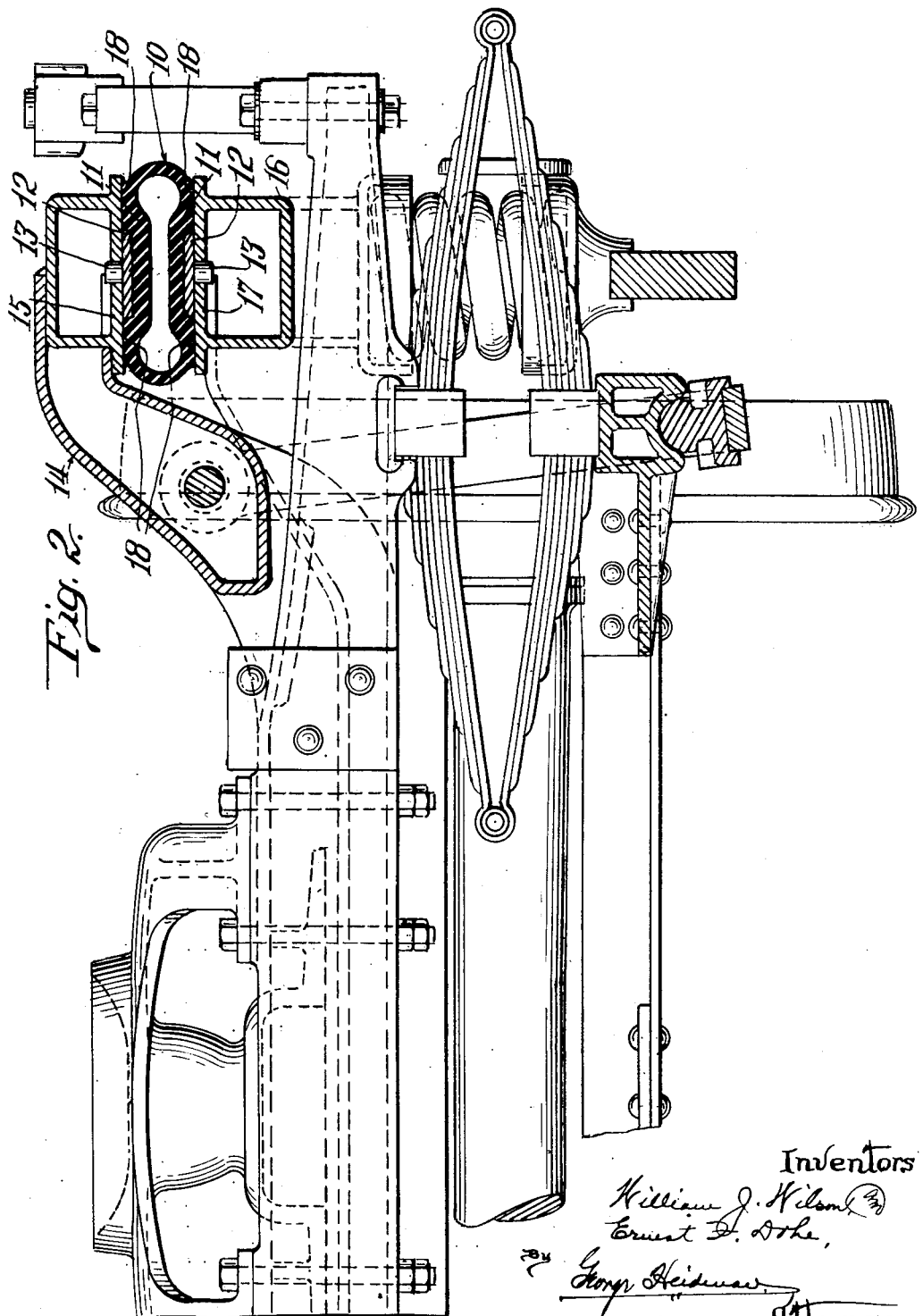

Nov. 21, 1939.   W. J. WILSON ET AL   2,180,492
AIR CUSHION RAIL TRUCK
Filed Nov. 29, 1937   3 Sheets-Sheet 3

Inventors
William J. Wilson
Ernest F. Dohe,
By George Heideman
Attorney.

Patented Nov. 21, 1939

2,180,492

UNITED STATES PATENT OFFICE 2,180,492

AIR CUSHION RAIL TRUCK

William J. Wilson and Ernest F. Dohe, Omaha, Nebr.

Application November 29, 1937, Serial No. 177,037

3 Claims. (Cl. 105—208.1)

Our invention relates more particularly to air cushion means for the trucks of railroad cars, arranged in such manner as to support and carry the body of the car, whether arranged intermediate of certain frame members of the truck or intermediate of the truck side frame members and the journal bearings of the truck.

Our invention has for its object the insulating of the car body from the noise and vibration generating parts of the truck through the intervention of air cushion means between certain metallic elements of the truck or between the car body and the truck in order that an all metallic contact between the car body and the rail will be interrupted and the noise or vibration generally originated by or within the truck may not be transmitted to the body of the car.

Another object of our invention is to soften and reduce to a minimum the shocks encountered when the car passes over uneven rail-joints, switch frogs, cross-overs, and the like, particularly at high speeds, and thereby materially increase the riding qualities of the car and hence provide the desired ease and comfort in rail travel.

The above enumerated objects and the advantages inherent in the invention will all be more readily comprehended from the detailed description of the accompanying drawings, wherein—

Figure 1 is a side elevation of a portion of a standard six wheel type of passenger car truck illustrating an application of our invention thereto, as applied between a bolster carrying member and the side frame members of the truck.

Figure 2 is a vertical sectional view taken substantially on the line 2—2 of Figure 1, looking in the direction of the arrows.

Figure 5 is a diagrammatic illustration of a manner of supplying the inflating medium and controlling the pressure and roll of the car.

Figures 3, 4:
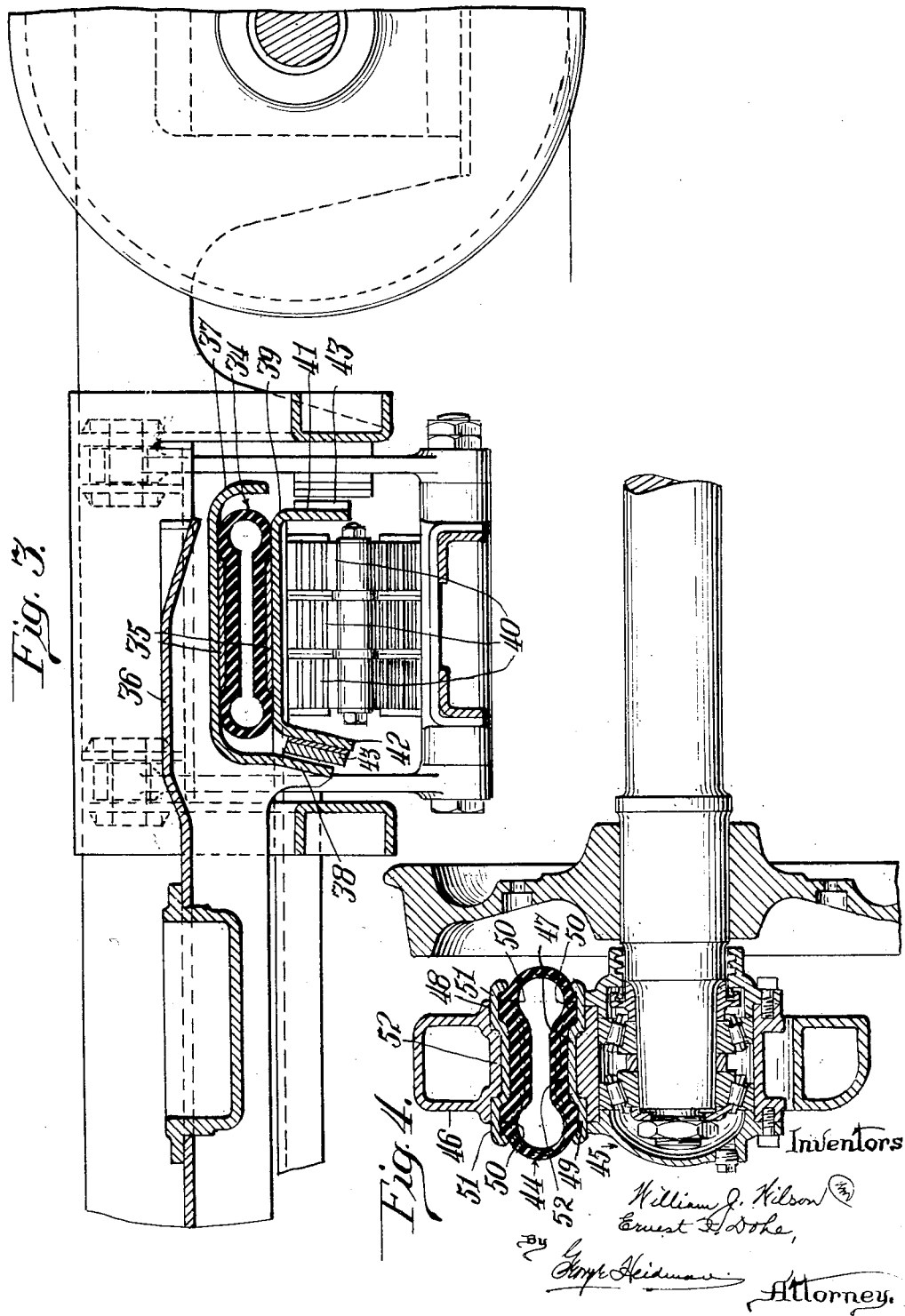
Figure 3 is a sectional view of a portion of a passenger car truck illustrating a modified application.
Figure 4 is a vertical sectional view of a portion of a car journal illustrating application of our invention to the journal box.

Our invention is more especially intended for use on the trucks of railroad passenger cars, although it may have application to other types of conveyances, and has for its object the elimination of noises and vibration by insulating the car body from the portions of the truck where such vibrations occur; in other words, to interrupt the metallic contact between the car body and the rail so as to prevent the noises and vibrations originating in the truck from being transmitted to the body of the car.

The invention contemplates means which will soften and reduce to a minimum the shocks encountered when the car passes over uneven rail joints, switch frogs, cross-overs, and the like, at high speeds, and hence greatly increases the ease and comfort riding characteristics of the car.

The invention contemplates the use of air cushions intermediate of certain load transmitting and load carrying members of the car; the air cushions being of length and dimensions commensurate with the particular application or type of car truck. These air cushions, which are employed at similar positions on both sides of the car truck, are preferably identical in construction as indicated at 10 in Figures 1 and 2 and are constructed of suitably moulded rubber with reenforcing embedded fabric in a manner similar to that used in automobile tire construction, except that in the application as shown in Figure 1 it consists of an elongated tubular construction oblong in cross section and provided with closed ends.

The cushions, as shown in the cross-section, Figure 2, are formed with comparatively thick intermediate wall portions indicated at 11 and these wall portions on the outer surfaces are provided with metal plates 12 both at top and bottom. These metal plates may be of similar construction and preferably extend throughout the major length of the cushion means. The metal plates are preferably vulcanized to the rubber portion of the cushion and in the specific exemplification shown in Figure 2 are provided with lugs or dowel portions 13 of predetermined size. These projecting lugs or dowel portions 13 are adapted to extend into recesses or openings formed in the adjacent elements of the truck. In the type of truck illustrated, a bolster carrying member 14 at its opposite sides terminates in the flat portions 15 disposed in a direction lengthwise of the truck side frame; and this flat portion 15, at each side of the member, is shown apertured or recessed to receive the lug or dowel portion 13 to maintain the proper relation between the member and our improved air cushion means 10. The side frame member 17 is likewise provided with a flat upper surface, corresponding to that of the member 14, and this top surface 17 of the side frame 16 is also provided with an opening or recess to receive the projecting lug or dowel portion 13. With the member 14 and the side frame member both having the dowel relation with the air cushion, improper lateral movement of the air cushion relative to the member and side frame is impossible.

The top and bottom surfaces of the air cushion on opposite sides of the metallic inserts or steel plates 12 are preferably made substantially plain so as to have wide bearing relation with the member and the truck frame, as shown at 18 in Figure 2; the surfaces 18 of the air cushion being preferably arranged in the same plane as the steel plates, or substantially so. The steel plates or metallic inserts 12 are adapted to take up any frictional or rubbing action between the air cushion and the truck members. The walls of the cushions at opposite sides of the plates are of comparative thickness so that in the event of deflation the thick cushion walls will provide rubber pads in compression between the load carrying and the load supporting members of the truck.

It will be understood that the air cushions 10 on both sides of the truck are preferably substantially coextensive with the bearing surfaces of the bolster carrying member; although, if desired, a number of air cushions of similar construction, may be employed on each side of the truck.

It will be understood that the air cushions 10 are provided with suitable valved inlets whereby they may be inflated to the desired pressure. The inflation pressures would, of course, vary with the total weight or carrying load of the car. In cases where more than one cushion to a truck is required, as for example in the illustration in Figures 1 and 2, the two cushions (or all cushions of the truck) may be connected in parallel by means of flexible tubing or hose through which the pressure of all the cushions is equalized.

In Figure 5 we illustrate a method of inflation control wherein the air cushions at opposite sides of the truck are indicated at 10, 10 each provided with inlet tubes at 19 which in turn are connected with a nipple 20 and tube 21 which lead to and are connected with a suitable valve or choke indicated at 22. Choke 22 is also provided with an air line 23 which in turn connects with the supply or air brake train line 24. The air line 23 is shown provided with a suitable pressure regulating valve at 25. The connections between the choke and the tubes 20 and 21 are such that sufficient flow of air for inflation purposes is permitted from the pressure line 23; the orifices of the connections being too small for free flow of air from one cushion to the other. The opposite ends of the cushions 10, 10 are shown provided with flexible tubes 26, 26 which connect with a roll control valve 27.

The valve 27 comprises a suitable casing with a chamber provided with a suitable balanced diaphragm 28; the tube connections 26, 26 communicating with the chamber on opposite sides of the diaphragm. The diaphragm in turn controls a pair of valves 29, 29ª located at opposite sides of the diaphragm; the valve 29 controlling flow through an outlet into conduit 30 which is connected with an auxiliary reservoir 31 while valve 29ª controls flow through a conduit 30ª which is connected with an auxiliary reservoir 31ª.

The mechanism just described is intended to control the teeter or roll of the car from side to side. For example, if the car tilts toward the cushion 10 at the upper side of Figure 5, the pressure in that cushion is increased or built up with the result that the pressure in the chamber on the upper side of diaphragm 28 (as viewed in Figure 5) causes the diaphragm to flex downwardly thereby closing valve 29 and prevents passage of the air to the auxiliary reservoir 31, with the result that the pressure in the cushion 10 at the upper side in Figure 5 will build up more rapidly than would be the case if the cushion was in communication with the auxiliary reservoir. This building up of pressure in the air cushion 10, at the upper side, will also be more rapid and to a higher degree of pressure than is true of the pressure in the cushion 10 at the lower side in Figure 5 with the result that the roll or tilting of the car will be checked quickly. As soon as the roll or tilt of the car is checked and the car again rights itself, the pressures in both air cushions will become equal and cause diaphragm 28 to return to normal position where both valves 29 and 29ª will be open. With this construction, vertical movement between the truck and car on both sides of the longitudinal center line and therefore effective upon both cushions will not affect the diaphragm 28.

The tubes 26 are also shown provided with extensions 26ª, 26ª which may lead to a suitable point in the car and are provided at their upper ends with pressure gauges indicated at 32 so that the train crew will be able to determine the air pressure in the cushions 10. The air line 23 intermediate of the air pressure regulating valve 25 and the air brake train line 24 is preferably provided with a cut-off cock, as at 33.

With our improved means and method of inflation, the period of oscillation of the car may be controlled by the combined volume of the cushions and the auxiliary reservoirs and the proper functioning of the mechanism and of the air cushions may at all times be noted by the train crew while the train is in operation.

In Figure 3 we illustrate application of our improved air cushion means to a different car truck and also a different application thereof. The air cushion means 34 is substantially similar to the air cushion 10 being provided intermediate of its longitudinal sides with the metallic inserts or steel plates 35 which are preferably vulcanized to the rubber cushion; the later being formed with larger air spaces or chambers at the opposite sides, as clearly shown; the thickened walls of the cushion, beyond the sides of the inserts or steel plates, being also preferably made flat to provide better contact or bearing relation.

In this construction, the bolster 36 is shown provided with the depending flanges 37 and 38 disposed at opposite sides of the air cushion 34 and in spaced relation therewith so as to provide a semblance of a pocket or channel for the air cushion means which seats on the spring saddle member 39 arranged across the tops of the elliptic spring assembly shown at 40. The saddle 39 is likewise provided with depending sides or flange portions 41 and 42 arranged to extend substantially parallel with and sufficiently spaced from the respective flange portions 37 and 38 of the bolster. The saddle flanges or depending sides 41 and 42 are preferably provided with cushion members or rubber blocks 43 vulcanized or otherwise properly secured to these flange portions to provide a non-metallic contact between bolster and spring saddle during relative vibratory movement between said elements.

In Figure 4 we illustrate a different application of our invention. In the structure here shown, the general construction and cross-sectional configuration of the air cushion 44 is substantially like the air cushion means heretofore described. The air cushion 44 is here located above the journal box 45 and beneath the load carrying member 46 of the truck.

The air cushion 44, like in the previously described forms, is preferably enlarged along the two longitudinal sides, with the top and bottom walls somewhat increased in thickness intermediate of the opposite sides and this intermediate portion, both at top and bottom, dished or recessed to receive the correspondingly bent or dished portions 47 of the top and bottom plates or shoes 48, 49, which are preferably vulcanized to the air cushion 44. The air cushion, both at top and bottom, adjacent the longitudinal sides, is provided with flat surfaces disposed into horizontal planes slightly beyond that of the dished intermediate portions of the cushion and are shown shouldered at 50 to receive the curled or vent side edges 51 of the plates or shoes 48, 49 and thereby effect a greater anchorage with the air cushion against independent lateral movement.

By forming the intermediate portion of the anchor plate as described, these plates on their outer faces are provided with straight-sided channels or depressions adapted to match and receive the comparatively wide ribs 52, 52 of the load carrying truck member 46 and top of the journal box 45. This construction interlocks the respective elements against independent sidewise movement, while the pneumatic or inflated cushion will yieldingly absorb the shocks or impacts.

With our improved means metallic contact between the car body and certain elements of the truck is interrupted; the car body is insulated as it were from the noise and vibration generating parts of the truck and the shocks encountered by the truck will be softened and reduced to a minimum.

Providing the air cushions with comparatively large bearing surfaces or areas, exceptionally low inflation pressures need be employed and easy riding qualities provided.

It is apparent that the air cushions may be of cross-sectional form other than that disclosed in the exemplifications shown in the drawings and they may be of the outer casing and tube type instead of the single casing type shown and their general contours may be altered to accommodate the air cushions to different locations and to variations in truck structure. Then, too, instead of the methods shown for anchoring the air cushions in place, other methods may also be employed.

It is also apparent that the schematic illustration of method of inflation and control of the respective air cushions of a truck as shown in Figure 5 may be employed in connection with air cushions located as shown in Figures 3 and 4, or in connection with differently located air cushions; the method affording automatic control of inflation and pressure maintenance and variance in keeping with variations in load; the pressures of each car truck being readily determined by pressure gauges located within the cars.

What we claim is:

1. In a rail truck of the character described, inflatable resilient casings interposed between the load carrying and the load supporting elements at opposite sides of a car; a pressure controlling connection between the casings and the air brake line; an auxiliary reservoir for each casing, a valve controlled connection between each resilient casing and its respective reservoir, the reservoirs normally being in communication with their respective casings, and air pressure controlled means whereby the communication between a casing and its reservoir is interrupted when the pressure on said casing exceeds the pressure on the opposite casing, said means being adapted to establish communication between the casing and its reservoir when said excess pressure on the casing has been relieved.

2. In a rail truck of the character described, inflatable elements interposed between the load carrying and the load supporting members of a car and normally in communication with each other; a pressure regulating connection between said elements and the air line of the car; a choke connection between said first mentioned connection and the inflatable elements whereby free flow of air from one inflatable element to the other is prevented when the pressure on one element is suddenly increased beyond the normal pressure; an auxiliary reservoir normally in communication with each element; and pressure controlled means whereby communication between an element and its reservoir is interrupted when the pressure on the element exceeds the pressure on the other element, said means involving a diaphragm operated disc valve normally in open position.

3. In a truck, an air cushion arranged on each side between the load carrying and the load supporting elements and each consisting of two volumes normally in communication with each other; and means whereby one volume is automatically separated from the other when the pressure on one air cushion exceeds the pressure on the other air cushion, said means involving diaphragm operated disc valves normally in open position.

WILLIAM J. WILSON.
ERNEST F. DOHE.